US007776961B2

(12) United States Patent
Kitahara et al.

(10) Patent No.: US 7,776,961 B2
(45) Date of Patent: Aug. 17, 2010

(54) OXYGEN ABSORBER

(75) Inventors: Shizuo Kitahara, Tokyo (JP); Kazuyo Terada, Tokyo (JP)

(73) Assignee: Zeon Corporation, Tokyo (JP)

( * ) Notice: Subject to any disclaimer, the term of this patent is extended or adjusted under 35 U.S.C. 154(b) by 732 days.

(21) Appl. No.: 10/581,196

(22) PCT Filed: Nov. 26, 2004

(86) PCT No.: PCT/JP2004/017611

§ 371 (c)(1), (2), (4) Date: Jun. 1, 2006

(87) PCT Pub. No.: WO2005/053837

PCT Pub. Date: Jun. 16, 2005

(65) Prior Publication Data

US 2007/0123647 A1 May 31, 2007

(30) Foreign Application Priority Data

Dec. 4, 2003 (JP) ............................ 2003-406464
Jan. 23, 2004 (JP) ............................ 2004-015196

(51) Int. Cl.
*C08F 116/06* (2006.01)

(52) U.S. Cl. ..................... 525/56; 428/35.4; 428/317.1; 525/57; 524/502

(58) Field of Classification Search ................... 525/56, 525/57; 524/502; 428/35.4, 317.1
See application file for complete search history.

(56) References Cited

U.S. PATENT DOCUMENTS

| | | | |
|---|---|---|---|
| 1,846,247 A | 2/1932 | Bruson et al. | |
| 4,678,841 A | 7/1987 | Yoshizawa et al. | |
| 5,043,395 A | 8/1991 | Oshima et al. | |
| 6,426,396 B2 | 7/2002 | Nakano et al. | |
| 7,144,959 B2 | 12/2006 | Kitahara | |
| 7,267,887 B2 | 9/2007 | Kitahara et al. | |
| 7,279,533 B2 | 10/2007 | Kitahara et al. | |
| 7,396,865 B2 * | 7/2008 | Tsuji et al. | 524/87 |
| 2001/0023025 A1 | 9/2001 | Jerdee et al. | |
| 2002/0146527 A1 | 10/2002 | Kikuchi et al. | |
| 2003/0018114 A1 | 1/2003 | Tai et al. | |
| 2005/0003220 A1 | 1/2005 | Kitahara et al. | |
| 2005/0080199 A1 | 4/2005 | Kitahara | |
| 2005/0131149 A1 | 6/2005 | Kitahara | |
| 2005/0142373 A1 | 6/2005 | Komatsu et al. | |
| 2006/0063890 A1 | 3/2006 | Kitahara et al. | |
| 2007/0123647 A1 | 5/2007 | Kitahara et al. | |

FOREIGN PATENT DOCUMENTS

| | | | |
|---|---|---|---|
| EP | 0 194 677 | * | 9/1986 |
| EP | 1 449 643 | A1 | 8/2004 |
| EP | 1 489 108 | A1 | 12/2004 |
| EP | 1 589 037 | A1 | 10/2005 |
| JP | 60-223804 | A | 11/1985 |
| JP | 61-163904 | A | 7/1986 |
| JP | 64-1705 | A | 1/1989 |
| JP | 2001-507045 | A | 5/2001 |
| JP | 2002-146217 | A | 5/2002 |
| JP | 2003-12944 | A | 1/2003 |
| JP | 2003-504042 | A | 2/2003 |
| JP | 2003-71992 | A | 3/2003 |
| JP | 2003-292682 | A | 10/2003 |
| JP | 2005-230756 | A | 9/2005 |
| WO | WO-03/033255 | A1 | 4/2003 |
| WO | WO 03/046072 | A1 | 6/2003 |
| WO | WO-03/064481 | A1 | 8/2003 |
| WO | WO 2004/063230 | A1 | 7/2004 |
| WO | WO 2005/053837 | A1 | 6/2005 |
| WO | WO 2005/092940 | A1 | 10/2005 |
| WO | WO 2006/101020 | A1 | 9/2006 |
| WO | WO 2006/101021 | A1 | 9/2006 |

OTHER PUBLICATIONS

Office Action dated Jun. 15, 2009 issued in copending U.S. Appl. No. 12/084,106.

* cited by examiner

*Primary Examiner*—Robert D. Harlan
(74) *Attorney, Agent, or Firm*—Birch, Stewart, Kolasch & Birch, LLP

(57) ABSTRACT

The present invention provides an oxygen absorber which exhibits a high oxygen-absorbing ability even if a transition metal salt as a catalyst for making oxygen-absorbing ability high is not added thereto and further keeps a high mechanical strength even after the absorber absorbs oxygen. An oxygen absorber containing a cyclized conjugated diene polymer as an active ingredient. About the cyclized conjugated diene polymer, the percent decrease in unsaturated-bond amount is preferably 10% or more and the weight-average molecular weight preferably ranges 1,000 to 1,000,000. The oxygen absorber may further contain a thermoplastic resin. The content of an antioxidant in the oxygen absorber is preferably 500 ppm or lower. The oxygen absorber is in a film, sheet or powder form.

10 Claims, No Drawings

OXYGEN ABSORBER

TECHNICAL FIELD

The present invention relates to an oxygen absorber used to prevent deterioration by oxygen in the quality of foods, drinks, medical supplies and so on, more specifically, an oxygen absorber which exhibits a high oxygen-absorbing ability even if a transition metal salt is not added thereto, as a catalyst for making oxygen-absorbing ability high, and further keeps a high mechanical strength even after the absorber absorbs oxygen.

BACKGROUND ART

About foods, drinks and medical supplies and so on, the quality thereof is deteriorated by oxygen. They are therefore required to be stored in the absence of oxygen or under a condition that the oxygen content is very small.

For this reason, nitrogen may be filled into a container or a package for storing foods, drinks, medical supplies or the like. However, for example, there arises a problem that costs increase in the production thereof, or a problem that once the container is opened or the package is unwrapped, air flows thereinto from the outside, whereby the quality cannot be subsequently prevented from deterioration. Accordingly, various studies have been made for absorbing oxygen remaining into a container or package and removing the oxygen from the system.

Conventionally, as the method for removing oxygen in a container or a package, there has widely been performed a method of arranging there in a different small bag in which an oxygen absorber made mainly of iron powder is included. However, according to this method, inconveniences are generated in the case where a metal detector is used to detect an alien substance or in the case of cocking or warming something to eat or drink in an microwave oven although this method is economical and gives a large oxygen absorbing rate.

Thus, about container or packaging materials made of resin, studies have been made for causing the container or packaging materials themselves to have oxygen-absorbing ability.

Suggested is, for example, the use of an oxygen absorber containing a polyterpene such as poly(α-pinene) poly(β-pinene) or poly(dipentene) and a transition metal salt, which acts as an oxygen absorbing catalyst, such as cobalt neodecanoate or cobalt oleate (Patent Document 1).

Suggested is also the use of an oxygen absorber containing a conjugated diene polymer, such as polyisoprene or 1,2-polybutadiene, and a transition metal salt (Patent Document 2)

Furthermore, suggested is the use of an oxygen absorber containing a copolymer made from ethylene and cyclopentene, and a transition metal salt (Patent Document 3).

However, about these oxygen absorbers in the prior art, with the advance of oxygen absorbing reaction, the polymer therein may deteriorate so as to decrease the mechanical strength remarkably, or the transition metal salt may elute out. Therefore, the conventional oxygen absorbers cannot be adopted in accordance with the usage thereof.

Patent Document 1: Japanese Patent Application National Publication (Laid-Open) No. 2001-507045

Patent Document 2: Japanese Patent Application Laid-Open No. 2003-71992

Patent Document 3: Japanese Patent Application National Publication (Laid-Open) No. 2003-504042

DISCLOSURE OF THE INVENTION

Problems to be Solved by the Invention

An object of the present invention is to provide an oxygen absorber used to prevent deterioration in the quality of foods, drinks, medical supplies and so on by oxygen, more specifically, an oxygen absorber which exhibits a high oxygen-absorbing ability even if a transition metal salt is not added thereto, as a catalyst for making oxygen-absorbing ability high, and further keeps a high mechanical strength even after the absorber absorbs oxygen.

Means for Solving the Problems

The inventors have made eager studies to solve the above-mentioned problems, so as to find out that an oxygen absorber containing a cyclized conjugated diene polymer as an active ingredient exhibits a high oxygen-absorbing ability even if a transition metal salt is not added thereto as a catalyst and further keeps a high mechanical strength even after the absorber absorbs oxygen. On the basis of this finding, the invention has been made.

Thus, according to the invention, provided is an oxygen absorber, containing a cyclized conjugated diene polymer as an active ingredient.

In the oxygen absorber of the invention, the percent decrease in unsaturated-bond amount of the cyclized conjugated diene polymer is preferably 10% or more.

In the oxygen absorber of the invention, the weight-average molecular weight of the cyclized conjugated diene polymer is preferably 1,000 to 1,000,000.

The oxygen absorber of the invention may be an oxygen absorber containing a cyclized conjugated diene polymer as an active ingredient, and further containing a thermoplastic resin.

In the above-mentioned oxygen absorber, the thermoplastic resin is preferably at least one selected from the group consisting of polyolefin resin, polyester resin, and polyamide resin, and polyvinyl alcohol resin.

In the oxygen absorber of the invention, 500 ppm or lower of an antioxidant is preferably contained.

The oxygen absorber of the invention can be in a film, sheet or powder form.

The oxygen absorber of the invention may be an oxygen absorber wherein the cyclized conjugated diene polymer is a polymer containing a polar group.

In the above-mentioned oxygen absorber, the polar group is preferably at least one group selected from the group consisting of acid anhydride, carboxyl, hydroxyl, ester, epoxy and amino groups.

In the oxygen absorber of the invention, the content of the polar group is preferably 0.1 to 200 mmol per 100 g of the polar-group-containing cyclized conjugated diene polymer.

Effects of the Invention

According to the invention, provided is an oxygen absorber which exhibits a high oxygen-absorbing ability even if a transition metal salt is not added thereto, as a catalyst for making oxygen-absorbing ability high, and further keeps a high mechanical strength even after the absorber absorbs oxygen.

BEST MODE FOR CARRYING OUT THE INVENTION

The present invention will be described in detail hereinafter.

(Oxygen Absorber)

The oxygen absorber of the invention contains a cyclized conjugated diene polymer as an active ingredient.

The content by percentage of the cyclized conjugated diene polymer in the oxygen absorber is preferably 10% or more by weight, more preferably 30% or more by weight, even more preferably 50% or more by weight, and particularly preferably 80% or more by weight. When the content by percentage of the cyclized conjugated diene polymer is within the range, a favorable oxygen-absorbing ability is exhibited.

(Cyclized Conjugated Diene Polymer)

The cyclized conjugated diene polymer used in the invention is a compound obtained by causing a conjugated diene polymer to cyclization-react under the presence of an acid catalyst, and is a compound having in the molecule thereof a cyclic structure delivered from conjugated diene monomer units.

In the invention, the cyclized conjugated diene polymer may contain apolar group. The cyclized conjugated diene polymer containing a polar group can be obtained by a method of causing a conjugated diene polymer containing the polar group to cyclization-react under the presence of an acid catalyst, or some other method.

The polar group may be any group that has any atom other than carbon and hydrogen atoms. Examples thereof include acid anhydride, carboxyl, hydroxyl, thiol, ester, epoxy, amino, amide, cyano and silyl groups, and halogens. Of these, preferred are acid anhydride, carboxyl, hydroxyl, ester, epoxy and amino groups. More preferred are acid anhydride, carboxyl and hydroxyl groups. Particularly preferred are acid anhydride and carboxyl groups.

The content of the polar group is not particularly limited, and is usually 0.1 to 200 mmol, preferably 1 to 100 mmol, and even more preferably 5 to 50 mmol per 100 g of the cyclized conjugated diene polymer containing the polar group. If this content is too small or too large, the oxygen-absorbing ability tends to be poor.

The cyclized conjugated diene polymer containing a polar group can be produced, for example, by a method (1) of cyclizing a conjugated diene polymer containing no polar group under the presence of an acid catalyst to obtain a cyclized conjugated diene polymer, and then adding to this cyclized conjugated diene polymer a polar-group-containing ethylenically unsaturated compound, a method (2) of cyclizing a conjugated diene polymer containing the polar group under the presence of an acid catalyst, or a method (3) of adding a polar-group-containing ethylenically unsaturated compound to a conjugated diene polymer containing no polar group, and then cyclizing the resultant under the presence of an acid catalyst. Furthermore, a polar-group-containing ethylenically unsaturated compound may be caused to addition-react with the polar-group-containing cyclized conjugated diene polymer obtained in the method (2) or (3). The method (1) is preferred since the percent decrease in unsaturated-bond amount of the polar-group-containing cyclized conjugated diene polymer is easily adjusted.

The conjugated diene polymer is a homopolymer of a conjugated diene monomer or a copolymer of conjugated diene monomers, or a copolymer of a conjugated diene monomer and a different monomer copolymerizable therewith.

The conjugated diene monomer that can be used is not particularly limited, and examples thereof include 1,3-butadiene, isoprene, 2,3-dimethyl-1,3-butadiene, 2-phenyl-1,3-butadiene, 1,3-pentadiene, 2-methyl-1,3-pentadiene, 1,3-hexadiene, 4,5-diethyl-1,3-octadiene, and 3-butyl-1,3-octadiene. These monomers may be used alone or in combination of two or more thereof.

Of these, preferred are 1,3-butadiene and isoprene. More preferred is isoprene.

The different monomer copolymerizable with the conjugated diene monomer is not particularly limited. Specific examples thereof include aromatic vinyl monomers such as styrene, o-methylstyrene, p-methylstyrene, m-methylstyrene, 2,4-dimethylstyrene, ethylstyrene, p-t-butylstyrene, α-methylstyrene, α-methyl-p-methylstyrene, o-chlorostyrene, m-chlorostyrene, p-chlorostyrene, p-bromostyrene, 2,4-dibromostyrene, and vinylnaphthalene; acyclic olefin monomers such as ethylene, propylene and 1-butene; cyclic olefin monomers such as cyclopentene and 2-norbornene; non-conjugated diene monomers such as 1,5-hexadiene, 1,6-heptadiene, 1,7-octadiene, dicyclopentadiene, and 5-ethylidene-2-norbornene; and (meth)acrylic acid esters such as methyl(meth)acrylate and ethyl(meth)acrylate; and (meth) acrylonitrile, and (meth)acrylamide. These monomers may be used alone or in combination of two or more thereof.

The content by percentage of units of the conjugated diene monomer in the conjugated diene polymer is appropriately selected as long as the advantageous effects of the invention are not damaged, and is usually 40% or more by mole, preferably 60% or more by mole, and even more preferably 80% or more by mole. Of these, the polymer made only of the conjugated diene monomer units can be particularly preferably used. If the content by percentage of the conjugated diene monomer units is too small, the percent decrease in unsaturated-bond amount is not easily raised so that the oxygen-absorbing ability tends to be poor.

Specific examples of the conjugated diene polymer include natural rubber (NR), styrene-butadiene rubber (SBR), polyisoprene rubber (IR), polybutadiene rubber (BR), isoprene-isobutylene copolymer rubber (IIR), ethylene-propylene-diene copolymer rubber, and butadiene-isoprene copolymer rubber (BIR). Of these, polyisorepene rubber and polybutadiene rubber can be preferably used, and polyisoprene rubber can be more preferably used.

It is advisable that the method for polymerizing the conjugated diene polymer is performed in an ordinary method. For example, the polymerization is conducted by solution polymerization or emulsion polymerization using an appropriate catalyst such as a Ziegler polymerization catalyst containing titanium or the like as a catalyst ingredient, an alkyllithium polymerization catalyst or a radical polymerization catalyst.

The cyclized conjugated diene polymer used in the invention is obtained by causing the above-mentioned conjugated diene polymer to cyclization-react under the presence of an acid catalyst.

As the acid catalyst that is used in the cyclization reaction, one known in the prior art can be used. Examples thereof include sulfuric acid; organic sulfonic acid compounds such as fluoromethanesulfonic acid, difluoromethanesulfonic acid, p-toluenesulfonic acid, xylenesulfonic acid, alkylbenzenesulfonic acids each having an alkyl group having 2 to 18 carbon atoms, and acid anhydrides or alkylesters thereof; and metal halides such as boron trifluoride, boron trichloride, tin tetrachloride, titanium tetrachloride, aluminum chloride, diethylaluminum monochloride, ethylammonium dichloride, aluminum bromide, antimony pentachloride, tungsten hexachloride, and iron chloride. These acid catalysts may be used alone or in combination of two or more. Of these, the organic sulfonic acid compounds are preferred, and p-toluenesulfonic acid and an acid anhydride thereof can be more preferably used.

The used amount of the acid catalyst(s) is usually 0.05 to 10 parts by weight, preferably 0.1 to 5 parts by weight, and more preferably 0.3 to 2 parts by weight per 100 parts by weight of the conjugated diene polymer.

The cyclization reaction is usually performed by dissolving the conjugated diene polymer into a hydrocarbon solvent, and then causing the polymer to react under the presence of the acid catalyst.

The hydrocarbon solvent is not particularly limited if the solvent is a solvent that does not hinder the cyclization reaction. Specific examples thereof include aromatic hydrocarbons such as benzene, toluene, xylene, and ethylbenzene; aliphatic hydrocarbons such as n-pentane, n-hexane, n-heptane, and n-octane; and alicyclic hydrocarbons such as cyclopentane, and cyclohexane. When these hydrocarbon solvents are each used in the polymerization reaction of the conjugated diene monomer, this polymerizing solvent can be used, as it is, as the solvent for the cyclization reaction. In this case, the cyclization reaction can be conducted by adding the acid catalyst to the polymerization reaction solution wherein the polymerization reaction has ended. The used amount of the hydrocarbon solvent is within such a range that the solid concentration in the conjugated diene polymer will range usually 5 to 60% by weight, preferably 20 to 40% by weight.

The cyclization reaction may be conducted under any one of an increased pressure, a reduced pressure and the atmospheric pressure. The reaction is desirably conducted under the atmospheric pressure from the viewpoint of operation-simplicity. When the reaction is conducted in dry gas flow, particularly, in the atmosphere of dry nitrogen or dry argon, any side reaction resulting from water content can be restrained.

It is advisable that the reaction temperature and the reaction time in the cyclization reaction are in accordance with those in ordinary methods. The reaction temperature is usually 50 to 150° C., preferably 70 to 110° C. The reaction time is usually 0.5 to 10 hours, preferably 2 to 7 hours.

After the cyclization reaction, the acid catalyst is inactivated in an ordinary method, and the residue of the acid catalyst is removed. Thereafter, an antioxidant is added thereto if desired, and the hydrocarbon solvent is removed, whereby a cyclized conjugated diene polymer in a solid form can be obtained.

When the cyclized conjugated diene polymer will be made into a polymer containing a polar group, and when the cyclized conjugated diene polymer obtained as described above is a polymer containing no polar group, a polar-group-containing ethylenically unsaturated compound is nextly added to this cyclized conjugated diene polymer. This addition reaction can also be conducted subsequently to the cyclization reaction without removing the hydrocarbon solvent completely used in the cyclization reaction.

The polar-group-containing ethylenically unsaturated compound, which is used to introduce a polar group into the cyclized conjugated diene polymer, is not particularly limited, and examples thereof include ethylenically unsaturated compounds each having a polar group such as acid anhydride, carboxyl, hydroxyl, thiol, ester, epoxy, amino, amide, cyano and silyl groups, and a halogen.

Examples of the compound having acid anhydride or carboxyl group include ethylenically unsaturated carboxylic acid compounds, such as maleic anhydride, itaconic anhydride, aconitic anhydride, norbornenedicarboxylic anhydride, acrylic acid, methacrylic acid and maleic acid. Of these, maleic anhydride is preferably used from the viewpoint of reactivity and economical efficiency.

Examples of the compound containing a hydroxyl group include hydroxyalkyl esters of unsaturated acids, such as 2-hydroxyethyl(meth)acrylate, and 2-hydroxypropyl(meth)acrylate; unsaturated acid amides each having hydroxyl group, such as N-methylol(meth)acrylamide, and N-2-hydroxyethyl(meth)acrylamide; polyalkylene glycol monoesters of unsaturated acids, such as polyethylene glycol mono(meth)acrylate, polypropylene glycol mono(meth)acrylate, and poly(ethylene glycol-propylene glycol)mono(meth)acrylate; and polyhydric alcohol monoesters of unsaturated acids, such as glycerol mono(meth)acrylate. Of these, hydroxyalkyl esters of unsaturated acids are preferred, and 2-hydroxyethyl acrylate and 2-hydroxyethyl methacrylate are particularly preferred.

Examples of the ethylenically unsaturated compound containing some other polar groups include methyl(meth)acrylate, ethyl(meth)acrylate, butyl(meth)acrylate, glycidyl (meth)acrylate, dimethylaminoethyl(meth)acrylate, dimethylaminopropyl(meth)acrylate, (meth)acrylamide, and (meth)acrylonitrile.

The method for adding the polar-group-containing ethylenically unsaturated compound to the cyclized conjugated diene polymer is not particularly limited. A known reaction, which is generally called ene addition reaction or graft polymerization reaction, can be adopted.

This addition reaction is conducted by causing the cyclized conjugated diene polymer and the polar-group-containing ethylenically unsaturated compound to react with each other optionally under the presence of a radical generator. Examples of the radical generator include peroxides such as di-t-butyl peroxide, dicumyl peroxide, benzoyl peroxide, t-butylperoxide benzoate, methyl ethyl ketone peroxide; and azonitriles such as azobisisobutyronitrile.

The addition reaction may be conducted in a solid phase state or in a solution state. Preferably, the reaction is performed in a solution state since the reaction is easily conducted. Examples of the solvent used include the same hydrocarbon solvents in the above-mentioned cyclization reaction.

The used amount of the polar-group-containing ethylenically unsaturated compound is appropriately selected, and the amount is within such a range that the ratio of the introduced polar group is usually 0.1 to 200 mmol, preferably 1 to 100 mmol, and more preferably 5 to 50 mmol per 100 g of the polar-group-containing cyclized conjugated diene polymer.

The addition reaction may be conducted under any one of an increased pressure, a reduced pressure and the atmospheric pressure. The reaction is desirably conducted under the atmospheric pressure from the viewpoint of operation-simplicity. When the reaction is conducted in dry gas flow, particularly, in the atmosphere of dry nitrogen or dry argon, a decrease in the addition reaction rate, which results from water content, can be restrained.

In the addition reaction, the reaction temperature is usually 30 to 250° C., preferably 60 to 200° C., and the reaction time is usually 0.5 to 5 hours, preferably 1 to 3 hours.

The method for adding the polar-group-containing ethylenically unsaturated compound to the polar-group-containing cyclized conjugated diene polymer may be according to the above-mentioned method for adding the polar-group-containing ethylenically unsaturated compound to the cyclized conjugated diene polymer containing no polar group.

At this time, the used amount of the polar-group-containing ethylenically unsaturated compound is appropriately selected. The amount is within such a range that the total of the group introduced by the addition reaction and the polar group which the cyclized conjugated diene polymer has before the addition is usually 0.1 to 200 mmol, preferably 1 to 100 mmol, and more preferably 5 to 50 mmol per 100 g of the polar-group-containing cyclized conjugated diene polymer.

The method for adding the polar-group-containing ethylenically unsaturated compound to the conjugated diene polymer containing no polar group may be according to the above-mentioned method for adding the polar-group-containing ethylenically unsaturated compound to the cyclized conjugated diene polymer containing no polar group.

At this time, the used amount of the polar-group-containing ethylenically unsaturated compound is appropriately selected. The amount is within such a range that after the cyclization reaction of the resultant addition product the ratio of the polar group is usually 0.1 to 200 mmol, preferably 1 to 100 mmol, and more preferably 5 to 50 mmol per 100 g of the polar-group-containing cyclized conjugated diene polymer.

The percent decrease in unsaturated-bond amount of the cyclized conjugated diene polymer is usually 10% or more, preferably 40 to 75%, and more preferably 55 to 70%. If the percent decrease in unsaturated-bond amount is too small, a decrease in the mechanical strength after the absorption of oxygen tends to be large. Conversely, if the percent thereof is too large, the production thereof tends to be difficult and further the oxygen-absorbing ability tends to be lower.

The percent decrease in unsaturated-bond amount is an index which represents the degree that unsaturated bonds are decreased by cyclization reaction in the moiety of conjugated diene monomer units in a conjugated diene polymer, and is a numerical value obtained as follows: in the moiety of conjugated diene monomer units in a conjugated diene polymer, the ratio of the peak area of protons bonded directly to double bonds to the peak area of all protons is obtained by proton NMR analysis at each of times before and after the cyclization reaction thereof, and then the percent decrease thereof is calculated.

In the moiety of conjugated diene monomer units in a conjugated diene polymer, the peak area of all protons before the cyclization reaction is represented by SBT, the peak area of protons bonded directly to double bonds before the reaction is represented by SBU, the peak area of all protons after the cyclization reaction is represented by SAT, and the peak area of protons bonded directly to double bonds after the reaction is represented by SAU.

In this case, the ratio (SB) of the peak area of the protons bonded directly to the double bonds before the cyclization reaction is represented as follows:

$$SB=SBU/SBT$$

The ratio (SA) of the peak area of the protons bonded directly to the double bonds after the cyclization reaction is represented as follows:

$$SA=SAU/SAT$$

Accordingly, the percent decrease in unsaturated-bond amount is obtained by the following equation:

$$\text{Percent decrease in unsaturated-bond amount } (\%)=100\times(SB-SA)/SB$$

The percent decrease in unsaturated-bond amount of the cyclized conjugated diene polymer can be adjusted by selecting the amount of the acid catalyst in the cyclization reaction, the reaction temperature and reaction time thereof, and others appropriately.

The weight-average molecular weight of the cyclized conjugated diene polymer, which is the molecular weight in terms of standard polystyrene measured by gel permeation chromatography, is usually 1,000 to 1,000,000, preferably 10,000 to 700,000, and more preferably 30,000 to 500,000.

If the weight-average molecular weight of the cyclized conjugated diene polymer is too low, the polymer is not easily formed into a film and the mechanical strength tends to be lower. If the weight-average molecular weight of the cyclized conjugated diene polymer is too high, the viscosity of the solution in the cyclization reaction increases so that the solution is not easily handled. Additionally, when the polymer is subjected to extrusion molding, the workability thereof tends to be lower.

The weight-average molecular weight of the cyclized conjugated diene polymer can be adjusted by selecting the weight-average molecular weight of the conjugated diene polymer used as a raw material appropriately.

The glass transition temperature (Tg) of the cyclized conjugated diene polymer is not particularly limited, and can be appropriately selected in accordance with the usage thereof. The Tg is usually −50 to 200° C., preferably 0 to 100° C., more preferably 20 to 90° C., and particularly preferably 30 to 70° C. If the Tg of the cyclized conjugated diene polymer is out of these ranges, problems may be caused about handleability.

The Tg of the cyclized conjugated diene polymer can be adjusted by selecting the composition of the conjugated diene polymer used as a raw material or the percent decrease in unsaturated-bond amount thereof appropriately.

When the cyclized conjugated diene polymer contains a polar group, the gel amount therein (the ratio of insolubles in toluene) is usually 10% or less by weight, preferably 5% or less by weight. The polymer is particularly preferably a polymer which does not substantially contain any gel. If the gel amount is too large, the workability lowers at the time of the extrusion molding so that the polymer is not easily molded into a smooth film, or the polymer is not easily prepared into a homogeneous solution.

The cyclized conjugated diene polymer used in the invention preferably contains an antioxidant.

The antioxidant content in the cyclized conjugated diene polymer is preferably 500 ppm or lower, more preferably 400 ppm or lower, and particularly preferably 300 ppm or lower. If this content is too large, the oxygen-absorbing ability of the oxygen absorber obtained by use of this cyclized conjugated diene polymer tends to be lower. The lower limit of the antioxidant content is preferably 10 ppm, more preferably 20 ppm.

The antioxidant that can be used is not particularly limited if the antioxidant is one that is ordinarily used in the field of resin material or rubber material. Specific examples thereof include phenolic antioxidants and phosphite antioxidants.

Specific examples of the phenolic antioxidants include vitamin E, tetrakis-(methylene-3-(3',5'-di-t-butyl-4'-hydroxyphenyl)propionate)methane, 2,5-di-t-butylhydroquinone, 2,6-di-t-butyl-p-cresol, 4,4'-thiobis-(6-t-butylphenol), 2,2'-methylene-bis-(4-methyl-6-t-butylphenol), octadecyl-3-(3',5'-di-t-butyl-4'-hydroxyphenyl)propionate, 4,4'-thiobis-(6-t-butylphenol), 2-t-butyl-6-(3-t-butyl-2-hydroxy-5-methylbenzyl)-4-methylphenylacrylate, pentaerythritol tetrakis(3-laurylthiopropionate), pentaerythritol tetrakis[3-(3,5-di-t-butyl-4-hydroxyphenyl)propionate], 2,6-di-(t-butyl)-4-methylphenol, 2,2'-methylenebis-(6-t-butyl-p-cresol), 1,3,5-tris(3,5-t-butyl-4-hydroxybenzyl)-1,3,5-triazine-2,4,6-(1H,3H,5H)-trione, and 2,6-di-butyl-4-(4,6-bisoctylthio)-1,3,5-triazin-2-ylamino)phenol.

Specific examples of the phosphite antioxidants include (2,2'-methylenebis(4,6-di-t-butylphenyl)octylphosphite, tris (2,4-di-t-butylphenyl)phosphite, tris(nonylphenyl)phosphite, triphenyl phosphite, tris(nonylphenyl)phosphite, tris (2-ethylhexyl)phosphite, trisdecylphosphite, tris(tridecyl) phosphite, diphenylmono(2-ethylhexyl)phosphite, diphenylmonodecyl phosphite, didecylmonophenyl phosphite, diphenylmono(tridecyl)phosphite, dilaurylhydrogen phosphite, diphenylhydrogen phosphite, tetraphenyldipropylene glycol phosphite, tetraphenyltetra(tridecyl)pentaerythritol tetraphosphite, tetra(tridecyl)-4,4'-isopropylidene diphenyl diphosphite, bis(nonylphenyl)pentaerythritol diphosphite, distearyl pentaerythritol diphosphite, hydrogenated bisphenol A/pentaerythritol phosphite polymer, bis(2,4-di-t-butylphenyl)pentaerythritol diphosphite, bis(2,4-di-t-butyl-3-methylphenyl)pentaerythritol diphosphite, and phosphite compounds represented by the following formulae (1) to (4).

These antioxidants may be used alone or in combination of two or more thereof.

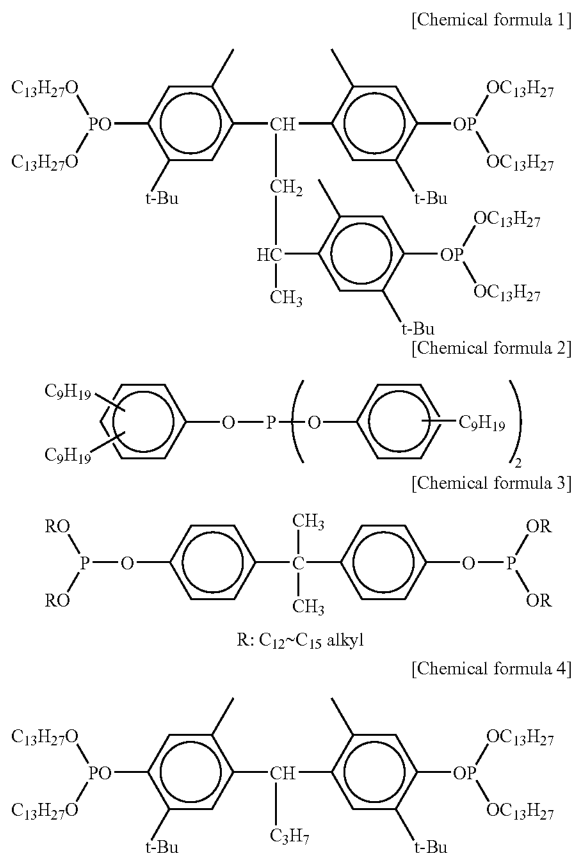

It is preferred to incorporate a polymer material other than the cyclized conjugated diene polymer into the oxygen absorber of the invention. When the polymer material other than the cyclized conjugated diene polymer is incorporated into the oxygen absorber of the invention, the tear strength is improved.

The polymer material that can be used, which is other than the cyclized conjugated diene polymer, is not particularly limited, and is preferably a thermoplastic resin. Various rubbers may be used together with the thermoplastic resin.

About the polymer material other than the cyclized conjugated diene polymer, one species thereof may be used alone or two or more species thereof may be used together.

In the oxygen absorber containing the cyclized conjugated diene polymer and the polymer material other than the cyclized conjugated diene polymer, the content of the cyclized conjugated diene polymer is preferably 100 to 10% by weight, more preferably 90 to 20% by weight, more preferably 85 to 30% by weight, and particularly preferably 80 to 50% by weight. In the range, balance between the oxygen-absorbing ability and the tear strength is well kept, and the oxygen-absorbing ability is better as the ratio of the cyclized block copolymer is higher.

The thermoplastic resin is not particularly limited, and is preferably at least one selected from the group consisting of polyolefin resin, polyester resin, and polyamide resin, and polyvinyl alcohol resin.

Specific examples of the polyolefin resin include olefin homopolymers such as polyethylene, polypropylene, polybutene-1, and poly-4-methylpentene; copolymers made of ethylene and α-olefin, such as ethylene-propylene random copolymer, ethylene-propylene block copolymer, ethylene-propylene-polybutene-1 copolymer, and ethylene-cyclic olefin copolymer; ethylene-α,β-unsaturated carboxylic acid copolymer, ethylene-α,β-unsaturated carboxylic acid ester copolymer, ion-crosslinked products of ethylene-α,β-unsaturated carboxylic acid copolymer, ethylene-vinyl acetate copolymer, partially- or completely-saponificated products of ethylene-vinyl acetate copolymer, and other ethylene copolymers; and graft-modified polyolefin resins obtained by graft-modifying these polyolefin resins with an acid anhydride such as maleic anhydride.

Specific example of the polyester resin includes polyethylene terephthalate.

Specific examples of the polyamide resin include nylon-6, nylon-6,6, and nylon-6,12.

Specific examples of the polyvinyl alcohol resin include polyvinyl alcohol, and partially- or completely-saponificated products of ethylene-vinyl acetate copolymer.

Of these thermoplastic resins, polyolefin resins, particularly, olefin homopolymers and copolymers made of ethylene and α-olefin are preferred since they are excellent in compatibility with the cyclized conjugated diene polymer.

Examples of the rubber that can be used together with these thermoplastic resins include natural rubber, polybutadiene rubber, polyisoprene rubber, poly(acrylonitrile-butadiene) rubber, poly(styrene-butadiene) rubber, and poly(ethylene-propylene-diene) rubber, and acrylic rubber.

The oxygen absorber of the invention preferably contains an antioxidant.

As the antioxidant, the same which can be incorporated into the cyclized conjugated diene polymer can be used.

The antioxidant content in the oxygen absorber of the invention is preferably 500 ppm or lower, more preferably 400 ppm or lower, and particularly preferably 300 ppm or lower. If this content is too large, the antioxidant tends to make the oxygen-absorbing ability low. The lower limit of the antioxidant content in the oxygen absorber is preferably 10 ppm, more preferably 20 ppm.

The oxygen absorber containing the antioxidant has a favorable workability at the time of the extrusion molding thereof. Thus, the oxygen absorber is easily molded into a smooth film, and the mechanical strength thereof is not lowered at the time of the molding.

In order to obtain the oxygen absorber containing the antioxidant, the antioxidant may be added in advance to the cyclized conjugated diene polymer used as a raw material thereof. Alternatively, when the oxygen absorber is prepared, the antioxidant may be incorporated thereinto.

As long as the advantageous effects of the invention are not damaged, an additive can be incorporated into the oxygen absorber of the invention, examples of the additive including a catalyst having an effect for making the oxygen-absorbing ability high, a photo initiator, a thermal stabilizer, a reinforcing agent, a filler, a flame retardant, a colorant, a plasticizer, an ultraviolet absorber, a lubricant, a desiccant, a deodorant, a flame retardant, an antistatic agent, an antitack agent, an antifogging agent, and a surfactant.

These additives are appropriately selected from additives known in the field of oxygen absorbers in accordance with purposes, and then appropriate amounts thereof can be incorporated.

The method for incorporating the additives is not particularly limited, and the incorporation may be performed by melting and kneading respective ingredients which constitute the oxygen absorber, or by mixing the ingredients in a solution state and subsequently removing the solvent therefrom.

The catalyst having the effect for making the oxygen-absorbing ability high is typically a transition metal salt. Even if the oxygen absorber of the invention does not contain such a transition metal salt, the oxygen absorber exhibits sufficient oxygen-absorbing ability. However, the incorporation of the transition metal salt causes the oxygen absorber to have a better oxygen-absorbing ability.

Examples of such a transition metal salt include salts exemplified in Japanese Patent Application National Publication (Laid-Open) No. 2001-507045, JP-A No. 2003-71992 and Japanese Patent Application National Publication (Laid-Open) No. 2003-504042. Preferred are cobalt (II) oleate, cobalt (II) naphthenate, cobalt (II) 2-ethylhexanoate, cobalt (II) stearate, cobalt (II) neodecanoate and so on. More preferred are 2-ethylhexanoate, cobalt (II) stearate, cobalt (II) neodecanoate.

The incorporated amount of the transition metal salt is usually 10 to 10,000 ppm, preferably 20 to 5,000 ppm, and more preferably 50 to 5,000 ppm of the oxygen absorber.

The photoinitiator has an effect of promoting the initiation of oxygen absorbing reaction when energy rays are radiated onto the oxygen absorber.

Examples of the photoinitiator include benzophenones, acetophenones, and anthraquinones exemplified in Japanese Patent Application National Publication (Laid-Open) No. 2003-504042.

The incorporated amount of the photoinitiator is usually 0.001 to 10% by weight, preferably 0.01 to 1% by weight of the oxygen absorber.

The form of the oxygen absorber of the invention is not particularly limited, and the absorber can be used in various forms, such as film, sheet, pellet, and powder forms. The shape of the pellets and particles is not limited. Of these, when the oxygen absorber is in a sheet, film, or powder form, the surface area per unit weight becomes large so that the oxygen-absorbing rate can be favorably improved. The film or powder is more preferred.

The thickness of the film is usually 10 μm or more and less than 250 μm, and the thickness of the sheet is usually 250 μm or more and less than 3 mm.

The number-average particle diameter of the powder is usually 1 to 1,000 μm, preferably 10 to 500 μm.

The method for making the oxygen absorber of the invention into a desired shape is not particularly limited, and a method known in the prior art can be adopted.

In the case of the sheet or film, the oxygen absorber can be formed, for example, by solution casting, or by extrusion-forming through a die having a given shape, such as a T-die or a circular die, using a monoaxial or multiaxial melting extruder. Of course, compression molding, injection molding or the like can be adopted.

In the case of the powder, the powder-form oxygen absorber can be obtained, for example, by pulvering the oxygen absorber under an atmosphere where a temperature less than the Tg of the cyclized conjugated diene polymer thereinto.

A desired shape can be formed by use of blow molding, injection molding, vacuum forming, pressure forming, punch stretching forming, plug assist forming, and powdery molding.

When the oxygen absorber of the invention is used, the initiation of oxygen absorbing reaction is promoted or the oxygen-absorbing rate can be made high by the irradiation with energy rays. As the energy rays, for example, visible rays, ultraviolet rays, X-rays, electron beams, or γ-rays can be used. The amount of radiated energy can be appropriately selected in accordance with the kind of the used energy rays.

The oxygen absorber of the invention can be preferably used as an oxygen absorber for drinks such as beer, wine, fruit juice, and carbonated soft drinks; foods such as fruits, nuts, vegetables, meat products, infant foods, coffee, jam, mayonnaise, ketchup, edible oils, dressing, sauces, food boiled down in sweetened soy sauce, and milk products; and articles which deteriorate easily under the presence of oxygen, such as medical supplies, electronic parts, recording media, cosmetics, and gasoline.

EXAMPLES

The invention will be more specifically described by way of the following examples. In the following description, "parts" and "%" are "parts by weight" and "% by weight" unless otherwise specified.

Each of properties was evaluated as follows.

(1) Weight-Average Molecular Weight of a Cyclized Conjugated Diene Polymer

The weight-average molecular weight is represented by a value in terms of standard polystyrene based on gel permeation chromatographic analysis.

(2) Percent Decrease in Unsaturated-Bond Amount of a Cyclized Conjugated Diene Polymer The percent decrease in unsaturated-bond amount is obtained by proton NMR analysis with reference to methods described in the following documents (i) and (ii):

(i) M. a. Golub and J. Heller. Can. J. Chem, 41, 937 (1963)

(ii) Y. Tanaka and H. Sato, J. Polym. Sci: Poly. Chem. Ed., 17, 3027 (1979)

In the moiety of conjugated diene monomer units in a conjugated diene polymer, the peak area of all protons before cyclization reaction thereof is represented by SBT, the peak area of protons bonded directly to double bonds before the reaction is represented by SBU, the peak area of all protons after the cyclization reaction is represented by SAT, and the peak area of protons bonded directly to double bonds after the reaction is represented by SAU.

In this case, the ratio (SB) of the peak area of the protons bonded directly to the double bonds before the cyclization reaction is represented as follows:

$$SB=SBU/SBT$$

The ratio (SA) of the peak area of the protons bonded directly to the double bonds after the cyclization reaction is represented as follows:

$$SA=SAU/SAT$$

Accordingly, the percent decrease in unsaturated-bond amount is obtained by the following equation:

$$\text{Percent decrease in unsaturated-bond amount }(\%)=100\times(SB-SA)/SB$$

(3) Cyclization Ratio of a Cyclized Conjugated Diene Polymer

The degree of the cyclization of a conjugated diene polymer can be evaluated by the cyclization ratio thereof also.

The cyclization ratio is obtained by proton NMR analysis in accordance with the method described in the document (i).

(4) Oxygen Absorption Amount in a Film-Form Oxygen Absorber

Into a bag made of a three-layer film composed of an outer layer polyethylene terephthalate film (PET) 12 μm in thickness, an intermediate layer aluminum foil (Al) 20 μm in thickness, and an inner layer polyethylene film (PE) 30 μm in thickness are put together with 200 mL of air and a film-form oxygen absorber, and then the bag is sealed up. This is allowed to stand still at 25° C. for a given period. Thereafter, the concentration of oxygen inside the bag is measured with an oxygen concentration meter (oxygen analyzer HS-750, manufactured by Neutronics Inc.). From this result, the oxygen volume per day absorbed by 1 $m^2$ (in terms of the surface area) of the film-form oxygen absorber is obtained.

(5) Tensile Strength of a Film-Form Oxygen Absorber

A film-form oxygen absorber having a thickness of 100 to 120 μm is used, and the oxygen absorber is pulled at a tensile rate of 50 mm/minute in accordance with JIS K7127, so as to obtain the tensile strength of the film-form oxygen absorber.

The tensile strengths of the film-form oxygen absorber are measured before the absorption of oxygen and after the film-form oxygen absorber absorbs oxygen in an amount of 5% by weight of the film itself. The retention ratio of the latter tensile strength to the former tensile strength is calculated, and the tensile strength is judged on the basis of the following criterion:

○: The retention ratio is more than 70%.
Δ: The retention ratio is 50 to 70%.
x: The retention ratio is less than 50%.

(6) Oxygen Absorption Accumulation Amount in a Powder-Form Oxygen Absorber

Ten grams of a powder-form oxygen absorber is sprayed onto a vat made of stainless steel in such a manner that particles thereof do not overlap as much as possible. This is set into an air circulation oven, the temperature of which is controlled to 30° C. Change in the weight thereof is observed with time. The volume of oxygen absorbed by 1 g of the powder-form oxygen absorber is calculated. In this case, since the weight of the powder-form oxygen absorber increases with time, the calculation is made on the assumption that all of the increment thereof is generated by the matter that the oxygen absorber absorbs oxygen.

(7) Tear Strength in a Film-Form Oxygen Absorber

A test piece 100 μm in thickness is used and an Instron 5566 (manufactured by Instron Co.) is used as a testing device to measure the tear strength at 23° C. in accordance with JIS K 7128-3. The number (n) of times of the measurement is 5.

(8) Content of Acid Anhydride Group or Carboxylic Group in an Acid-Anhydride-Group- or Carboxylic-Group-Containing Cyclized Conjugated Diene Polymer The peak strength (at 1760 to 1780 $cm^{-1}$) of acid anhydride group and the peak strength (at 1700 $cm^{-1}$) of a carboxylic group are measured by Fourier transform infrared spectrometry. The content of acid anhydride group and that of the carboxylic group are obtained by a calibration curve method, and are represented by the contents (mmol) per 100 g of the whole of the polymer(s)

(9) Oxygen Absorption Amount of a Powder-Form Oxygen Absorber

Into a bag made of a three-layer film composed of an outer layer polyethylene terephthalate film (PET) 12 μm in thickness, an intermediate layer aluminum foil (Al) 20 μm in thickness, and an inner layer polyethylene film (PE) 30 μm in thickness are put together with 200 mL of air and a powder-form oxygen absorber, and then the bag is sealed up. This is allowed to stand still at 30° C. for a given period. Thereafter, the concentration of oxygen inside the bag is measured with an oxygen concentration meter (oxygen analyzer HS-750, manufactured by Neutronics Inc.). From this result, the oxygen volume per day absorbed by 1 g of the powder-form oxygen absorber is obtained.

Production Example 1

Production of a Cyclized Conjugated Diene Polymer A

Into a pressure-resistant reactor equipped with a stirrer, a thermometer, a reflux condenser, and a nitrogen gas introducing pipe were charged 300 parts of a polyisoprene (content of cis-1,4-bond units: 73%, content of trans-1,4-bond units: 22%, content of 3,4-bond units: 5%, and weight-average molecular weight: 174,000) cut into pieces 10 mm square together with 700 parts of toluene. The reactor was purged with nitrogen, and the reactor was heated to 85° C. While the solution was stirred, the polyisoprene was completely dissolved into toluene, and then thereto were added 2.4 parts of p-toluenesulfonic acid (subjected to refluxing dehydration in toluene so as to set the amount of water to 150 ppm or lower, the resultant being referred to as "anhydrous p-toluenesulfonic acid" hereinafter) so as to conduct cyclization reaction at 85° C. After the reaction for 4 hours, thereto was added a 25% solution of sodium carbonate in water, which contained 0.83 parts of sodium carbonate, so as to terminate the reaction. At 85° C., washing with 300 parts of ion exchange water was repeated 3 times to remove residues of the catalyst in the system.

To the solution of the resultant cyclized polymer was added a phosphite antioxidant (2,2'-methylenebis(4,6-di-t-butylphenyl)octylphosphite (ADKSTAB HP-10, manufactured by Asahi Denka Co., Ltd.)) in an amount corresponding to 300 ppm of the cyclized polymer, and then a part of toluene in the solution was distilled off. Furthermore, the resultant was vacuum-dried to remove toluene, thereby obtaining a solid cyclized conjugated diene polymer A. The percent decrease in unsaturated-bond amount and the weight-average molecular weight of the cyclized conjugated diene polymer A were measured. The results are shown in Table 1. In Table 1, the cyclization ratio thereof is also shown.

Production Example 2

Production of a Cyclized Conjugated Diene Polymer B

A cyclized conjugated diene polymer B was obtained and evaluated in the same manner as in Production Example 1 except that the used amount of anhydrous p-toluenesulfonic acid was changed to 2.25 parts and the amount of sodium carbonate added after the cyclization reaction was changed to 0.78 part. The results are shown in Table 1. In Table 1, the cyclization ratio thereof is also shown.

Production Example 3

Production of a Cyclized Conjugated Diene Polymer C

A cyclized conjugated diene polymer C was obtained and evaluated in the same manner as in Production Example 1 except that the polyisoprene was changed to a high cis polyisoprene having a weight-average molecular weight of 302,000, which was obtained by kneading Nipol IR-2200 (content of cis-1,4-bond units: 99% or more, manufactured by Nippon Zeon Corporation) roughly with rolls, the used amount of anhydrous p-toluenesulfonic acid was changed to 2.16 parts and the amount of sodium carbonate added after the cyclization reaction was changed to 0.75 part. The results are shown in Table 1. In Table 1, the cyclization ratio thereof is also shown.

Production Example 4

Production of a Cyclized Conjugated Diene Polymer D

A cyclized conjugated diene polymer D was obtained and evaluated in the same manner as in Production Example 1 except that the polyisoprene was changed to a polyisoprene composed of 68% of cis-1,4-bond units, 25% of trans-1,4-bond units, and 7% of 3,4-bond units and having a weight-average molecular weight of 141,000, the used amount of anhydrous p-toluenesulfonic acid was changed to 2.69 parts and the amount of sodium carbonate added after the cyclization reaction was changed to 1.03 parts. The results are shown in Table 1. In Table 1, the cyclization ratio thereof is also shown.

TABLE 1

| | Production Example 1 | Production Example 2 | Production Example 3 | Production Example 4 |
|---|---|---|---|---|
| Cyclized conjugated diene polymer | A | B | C | D |
| Weight-average molecular weight | 130,500 | 139,800 | 226,500 | 98,700 |
| Percent decrease in unsaturated-bond amount (%) | 64 | 56 | 61 | 66 |
| Cyclization ratio (%) | 78 | 70 | 76 | 81 |

Example 1

The cyclized conjugated diene polymer A was compression-molded at 100° C. without bringing the polymer A into contact with oxygen to produce a film (film-form oxygen absorber 1) 120 μm in thickness. The film-form oxygen absorber 1, 120 μm in thickness, cut into a size of 100 mm×100 mm was put together with 200 mL of air into a bag having a size of 150 mm×220 mm and made of a three-layer film composed of an outer layer polyethylene terephthalate film (PET) 12 μm in thickness, an intermediate layer aluminum foil (Al) 20 μm in thickness, and an inner layer polyethylene film (PE) 30 μm in thickness, and then the bag was sealed up. Next, the bag was allowed to stand still at 25° C. for one day, and then the concentration of oxygen inside the bag was measured with the oxygen concentration meter, so as to obtain the oxygen absorption amount of the film-form oxygen absorber 1. The result is shown in Table 2. The tensile strength of the oxygen absorber 1 was also measured before and after the absorption of oxygen. Thus, the retention ratio thereof was obtained. The result is shown in Table 2. The tear strength of the film-form oxygen absorber 1 was measured. As a result, it was 87.5 N/mm.

Examples 2 and 3

Film-form oxygen absorbers 2 and 3 were obtain in the same manner as in Example 1 except that the cyclized conjugated diene polymer A was changed to the cyclized conjugated diene polymers B and C, respectively. In the same manner as in Example 1, the oxygen absorption amounts thereof and the retention ratios of the tensile strength were measured. These results are shown in Table 2. The tear strength of the film-form oxygen absorber 2 of Example 2 was measured. As a result, it was 93.3 N/mm.

Example 4

A 30% solution of the cyclized conjugated diene polymer A in toluene was prepared without bringing the polymer A into contact with oxygen. Thereto was added cobalt neodecanoate so as to set the amount of the cobalt metal to 500 ppm of the cyclized conjugated diene polymer A. A part of toluene was distilled off from this solution. Thereafter, the resultant was vacuum-dried to remove toluene, thereby obtaining the cyclized conjugated diene polymer A containing cobalt neodecanoate.

A film-form oxygen absorber 4 was obtained in the same manner as in Example 1 except that the cyclized conjugated diene polymer A containing cobalt neodecanoate was used instead of the cyclized conjugated diene polymer A. The oxygen absorption amount and the retention ratio of the tensile strength were measured in the same manner as in Example 1. The results are shown in Table 2.

Examples 5 and 6

Film-form oxygen absorbers 5 and 6 were obtained in the same manner as in Example 4 except that the cyclized conjugated diene polymer A was changed to the cyclized conjugated diene polymers B and C, respectively. In the same manner as in Example 1, the oxygen absorption amounts thereof and the retention ratios of the tensile strength were measured. These results are shown in Table 2.

Example 7

A Henschel mixer was used to mix the cyclized conjugated diene polymer A and a polypropylene (PP) having a melt flow rate (MFR) of 6.4 (manufactured by Idemitsu Petrochemical Co., Ltd., F-744NP) at a ratio of 80/20, and then the mixture was melted and kneaded by means of a biaxial extruder, the temperature of which was set to 210° C., so as to produce a polymer mixture in the form of pellets. The pellets were molded into a sheet form with electrothermal rolls of 180° C. temperature, and the sheet was compression-molded at 160° C. into a cyclized conjugated diene polymer A/polypropylene kneaded film (film-form oxygen absorber 7) 120 μm in thickness. This film-form oxygen absorber 7 was cut into a size of 100 mm×100 mm, and put together with 200 mL of air into a bag having a size of 150 mm×220 mm and made of a three-layer film composed of an outer layer polyethylene terephthalate film (PET) 12 μm in thickness, an intermediate layer aluminum foil (Al) 20 μm in thickness, and an inner layer polyethylene film (PE) 30 μm in thickness, and then the bag was sealed up. Next, this was allowed to stand still at 25° C. for one day. Thereafter, the concentration of oxygen inside the bag was measured with the oxygen concentration meter. From the measured result, the oxygen absorption amount of the film-form oxygen absorber 7 was obtained. The tensile strength of the film-form oxygen absorber 7 was also measured before and after the absorption of oxygen. Thus, the retention ratio thereof was obtained. The result is shown in Table 2. The tear strength of the film-form oxygen absorber 7 was measured. As a result, it was 148.1 N/mm. It is understood that the tear strength was excellent as compared with that of Example 1. This is an advantage effect based on the mixing of the PP.

Example 8

A Henschel mixer was used to mix the cyclized conjugated diene polymer B and a polyethylene (PE) having a MFR of 2.0 (manufactured by Idemitsu Petrochemical Co., Ltd., LLDPE 0234) at a ratio of 45/55, and then the mixture was melted and kneaded by means of a biaxial extruder, the temperature of which was set to 200° C., so as to produce a polymer mixture in the form of pellets. The pellets were molded into a sheet form with electrothermal rolls of 180° C. temperature, and the sheet was compression-molded at 160° C. into a cyclized conjugated diene polymer B/polypropylene kneaded film (film-form oxygen absorber 8) 120 μm in thickness. This film-form oxygen absorber 8 was cut into a size of 100 mm×100 mm, and put together with 200 mL of air into a bag having a size of 150 mm×220 mm and made of a three-layer film composed of an outer layer polyethylene terephthalate film (PET) 12 μm in thickness, an intermediate layer aluminum foil (Al) 20 μm in thickness, and an inner layer polyethylene film (PE) 30 μm in thickness, and then the bag was sealed up. Next, this was allowed to stand still at 25° C. for one day. Thereafter, the concentration of oxygen inside the bag was measured with the oxygen concentration meter. From the measured result, the oxygen absorption amount of the film-form oxygen absorber 8 was obtained. The tensile strength of the film-form oxygen absorber 8 was also measured before and after the absorption of oxygen. Thus, the retention ratio thereof was obtained. The result is shown in Table 2. The tear strength of the film-form oxygen absorber 8 was measured. As a result, it was 137.6 N/mm. It is understood that the tear strength was excellent as compared with that of Example 2. This is an advantage effect based on the mixing of the PE.

Comparative Example 1

A 30% solution of a polyisoprene (content of cis-1,4-bond units: 73%, content of trans-1,4-bond units: 22%, content of 3,4-bond units: 5%, and weight-average molecular weight: 174,000) in toluene was prepared without bringing the polyisoprene into contact with oxygen. This was applied onto a polyethylene terephthalate film 50 μm in thickness, and dried to form a polyisoprene film (film-form oxygen absorber C1) 120 μm in thickness. This polyisoprene film was not permitted to be satisfactorily peeled from the polyethylene terephthalate film. Accordingly, the oxygen absorber C1 was cut, as it was, into 100 mm×100 mm. The test piece was used to measure the oxygen absorption amount in the same manner as in Example 1 provided that the surface area of the polyisoprene film (film-form oxygen absorber C1) was calculated from only a single surface thereof. The results are shown in Tables 2 and 5.

The polyisoprene film was permitted to be peeled to such an extent that the tensile strength was allowed to be measured. Accordingly, the retention ratio of the tensile strength of the polyisoprene film (film-form oxygen absorber C1) was measured in the same manner as in Example 1. The results are shown in Tables 2 and 5.

Comparative Example 2

A 20% solution of a β-pinene polymer (YS Resin PXN-1150N, manufactured by Yasuhara Chemical Co., Ltd.) in toluene was prepared, and then the polymer was precipitated and purified with methanol to obtain a β-pinene polymer wherein any antioxidant was removed.

A film-form oxygen absorber C2 was obtained in the same manner as in Example 1 except that the β-pinene polymer, wherein any antioxidant was removed, was used instead of the polyisoprene. In the same manner as in Example 1, the oxygen absorption amount and the retention ratio of the tensile strength were measured. The results are shown in Tables 2 and 5.

Comparative Example 3

An ethylene-cyclopentene (CPE) copolymer (weight-average molecular weight=83,500) wherein the amount of cyclopentene (CPE) units was 15.5% by mol was obtained in accordance with Example 16 in Japanese Patent Application National Publication (Laid-Open) No. 2003-504042.

A 30% solution of the ethylene-CPE copolymer in toluene was prepared without bringing the copolymer into contact with oxygen. It was applied onto a polyethylene terephthalate film 50 μm in thickness and then dried to form an ethylene-CPE copolymer film (film-form oxygen absorber C3) 120 μm in thickness. The ethylene-CPE copolymer film (film-form oxygen absorber C3) was peeled from the polyethylene terephthalate film, and cut into a 100 mm×100 mm size to obtain a test piece. This film-form oxygen absorber C3 was used to measure the oxygen absorption amount and the retention ratio of the tensile strength in the same manner as in Example 1. The results are shown in Tables 2 and 5.

Comparative Example 4

A 30% solution of a polyisoprene (content of cis-1,4-bond units: 73%, content of trans-1,4-bond units: 22%, content of 3,4-bond units: 5%, and weight-average molecular weight: 174,000) in toluene was prepared without bringing the copolymer into contact with oxygen. Thereto was added cobalt neodecanoate so as to set the amount of the cobalt metal to 1,000 ppm of the polyisoprene. This solution was applied onto a polyethylene terephthalate film 50 μm in thickness and then dried to form a polyisoprene film (film-form oxygen absorber C4) 120 μm in thickness. This polyisoprene film was not permitted to be satisfactorily peeled from the polyethylene terephthalate film. Accordingly, this film was cut, as it was, into 100 mm×100 mm. The test piece was used to measure the oxygen absorption amount in the same manner as in Example 1 provided that the surface area of the polyisoprene film (film-form oxygen absorber C4) was calculated from only a single surface thereof. The results are shown in Tables 2 and 5.

The polyisoprene film was permitted to be peeled to such an extent that the tensile strength was allowed to be measured. Accordingly, the retention ratio of the tensile strength of the polyisoprene film (film-form oxygen absorber C4) was measured in the same manner as in Example 1. The results are shown in Tables 2 and 5.

Comparative Example 5

A 20% solution of a β-pinene polymer (YS Resin PXN-1150N, manufactured by Yasuhara Chemical Co., Ltd.) in toluene was prepared, and then the polymer was precipitated and purified with methanol to obtain a β-pinene polymer wherein any antioxidant was removed.

A 30% solution of the pinene polymer, wherein any antioxidant was removed, in toluene was prepared without bringing the polymer into contact with oxygen. Thereto was added cobalt neodecanoate so as to set the amount of the cobalt metal to 1,000 ppm of the β-pinene polymer. This solution was applied onto a polyethylene terephthalate film 50 μm in thickness and then dried to form a β-pinene polymer film (film-form oxygen absorber C5) 120 μm in thickness. The β-pinene polymer film (film-form oxygen absorber C5) was not permitted to be satisfactorily peeled from the polyethylene terephthalate film. Accordingly, this film was cut, as it was, into 100 mm×100 mm. The test piece was used to measure the oxygen absorption amount in the same manner as in Example 1 provided that the surface area of the β-pinene polymer film (film-form oxygen absorber C5) was calculated from only a single surface thereof. The results are shown in Tables 2 and 5.

The β-pinene polymer film (film-form oxygen absorber C5) was permitted to be peeled to such an extent that the tensile strength was allowed to be measured. Accordingly, the retention ratio of the tensile strength of this film-form oxygen absorber C5 was measured in the same manner as in Example 1. The results are shown in Tables 2 and 5.

Comparative Example 6

An ethylene-cyclopentene (CPE) copolymer (weight-average molecular weight=83,500) wherein the amount of cyclopentene units was 15.5% by mol was obtained in accordance with Example 16 in Japanese Patent Application National Publication (Laid-Open) No. 2003-504042.

A 30% solution of the ethylene-CPE copolymer in toluene was prepared without bringing the copolymer into contact with oxygen. Thereto was added cobalt neodecanoate so as to set the amount of the cobalt metal to 1,000 ppm of the ethylene-CPE copolymer. This solution was applied onto a polyethylene terephthalate film 50 μm in thickness and then dried to form an ethylene-CPE copolymer film (film-form oxygen absorber C6) 120 μm in thickness. This ethylene-cyclopentene copolymer film (film-form oxygen absorber C6) was peeled from the polyethylene terephthalate film, and cut into a 100 mm×100 mm size to obtain a test piece. This film-form oxygen absorber C6 was used to measure the oxygen absorption amount and the retention ratio of the tensile strength in the same manner as in Example 1. The results are shown in Tables 2 and 5.

TABLE 2

| | Example 1 | Example 2 | Example 3 | Example 4 | Example 5 | Example 6 | Example 7 | Example 8 |
|---|---|---|---|---|---|---|---|---|
| Oxygen absorber | 1 | 2 | 3 | 4 | 5 | 6 | 7 | 8 |
| Polymer | Cyclized conjugated diene polymer A | Cyclized conjugated diene polymer B | Cyclized conjugated diene polymer C | Cyclized conjugated diene polymer A | Cyclized conjugated diene polymer B | Cyclized conjugated diene polymer C | Cyclized conjugated diene polymer A/PP | Cyclized conjugated diene polymer B/PE |
| Cobalt metal | Absent | Absent | Absent | Present | Present | Present | Absent | Absent |
| Oxygen absorption amount (mL/m$^2$ · day) | 51 | 53 | 59 | 63 | 65 | 70 | 40 | 24 |
| Retention ratio of tensile strength | ○ | ○ | ○ | ○ | ○ | ○ | ○ | ○ |

| | Comparative Example 1 | Comparative Example 2 | Comparative Example 3 | Comparative Example 4 | Comparative Example 5 | Comparative Example 6 |
|---|---|---|---|---|---|---|
| Oxygen absorber | C1 | C2 | C3 | C4 | C5 | C6 |
| Polymer | Polyisoprene | β-Pinene polymer | Ethylene-CPE copolymer | Polyisoprene | β-Pinene polymer | Ethylene-CPE copolymer |
| Cobalt metal | Absent | Absent | Absent | Present | Present | Present |
| Oxygen absorption amount (mL/m$^2$ · day) | 5 | 9 | 2 | 38 | 58 | 52 |
| Retention ratio of tensile strength | X | X | ○ | X | X | ○ |

Example 9

A lab blender (WARING BLENDOR, model 34BL97, manufactured by Waring Commercial Co.) was used to pulverize the cyclized conjugated diene polymer D without bringing the polymer into contact with oxygen, so as to obtain a powder-form oxygen absorber 9 having a number-average molecular weight of 150 μm.

The oxygen absorption accumulation amounts through this powder-form oxygen absorber 9 were measured. The results are shown in Table 3.

TABLE 3

| | Example 9 | | | | |
|---|---|---|---|---|---|
| Elapsed time | 1 day | 3 days | 5 days | 7 days | 15 days |
| Oxygen absorption accumulation amount (ml/g) | 21 | 43 | 65 | 112 | 137 |

The following are understood from Tables 2 and 3.

The oxygen absorber wherein polyisoprene is used and no cobalt salt is contained is poor in oxygen-absorbing ability and the retention ratio of tensile strength (Comparative Example 1). When a cobalt salt is incorporated thereinto, the oxygen-absorbing ability is improved but is insufficient. The retention ratio of the tensile strength is also poor (Comparative Example 4).

The oxygen absorber wherein β-pinene polymer is used and no cobalt salt is contained is poor in oxygen-absorbing ability and the retention ratio of tensile strength (Comparative Example 2). When a cobalt salt is incorporated thereinto, the oxygen-absorbing ability is improved but the retention ratio of tensile strength is poor (Comparative Example 5).

The oxygen absorber wherein ethylene-cyclopentene (CPE) copolymer is used and no cobalt salt is contained is poor in oxygen-absorbing ability (Comparative Example 3). When a cobalt salt is incorporated thereinto, the oxygen-absorbing ability is somewhat improved but is insufficient (Comparative Example 6).

On the contrary to these comparative examples, the oxygen absorbers of the invention are excellent in oxygen-absorbing ability and the retention ratio of tensile strength whether or not a cobalt salt is contained therein (Examples 1 to 6). When the cobalt salt is contained therein, the oxygen-absorbing ability is better.

It is also understood that the oxygen absorbers containing a cyclized conjugated diene polymer and a thermoplastic resin are also excellent in oxygen-absorbing ability and the retention ratio of tensile strength (Examples 7 and 8).

Also, the powder-form oxygen absorber of the invention is excellent in oxygen-absorbing ability (Example 9).

Production Example 5

Production of a Polar-Group-Containing Cyclized Conjugated Diene Polymer A

Into a pressure-resistant reactor equipped with a stirrer, a thermometer, a reflux condenser, and a nitrogen gas introducing pipe were charged 300 parts of a polyisoprene (content of cis-1,4-bond units: 73%, content of trans-1,4-bond units: 22%, content of 3,4-bond units: 5%, and weight-average molecular weight: 174,000) cut into pieces 10 mm square together with 700 parts of toluene. The reactor was purged with nitrogen, and the reactor was heated to 85° C. While the solution was stirred, the polyisoprene was completely dissolved into toluene, and then thereto were added 2.4 parts of p-toluenesulfonic acid (subjected to refluxing dehydration in toluene so as to set the amount of water to 150 ppm or lower, the resultant being referred to as "anhydrous p-toluenesulfonic acid" hereinafter) so as to conduct cyclization reaction at 85° C. After the reaction for 4 hours, thereto was added a 25% solution of sodium carbonate in water, which contained 0.83 parts of sodium carbonate, so as to terminate the reaction. At 85° C., washing with 300 parts of ion exchange water was repeated 3 times to remove residues of the catalyst in the system.

To the solution of the resultant cyclized polymer were added 7.5 parts of maleic anhydride, so as to conduct addition reaction at 160° C. for 4 hours. A part of toluene in the solution was distilled off, and to the solution was added a phosphite antioxidant (2,2'-methylenebis(4,6-di-t-butylphenyl)octylphosphite (ADKSTAB HP-10, manufactured by Asahi Denka Co., Ltd.)) in an amount corresponding to 300 ppm of the polar-group-containing cyclized polymer. Thereafter, a part of toluene in the solution was distilled off. Furthermore, the resultant was vacuum-dried to remove toluene and unreacted maleic anhydride, thereby obtaining a solid polar-group-containing cyclized conjugated diene polymer A. The percent decrease in unsaturated-bond amount and the weight-average molecular weight of the polar-group-containing cyclized conjugated diene polymer A, and the polar group content therein were measured. The results are shown in Table 4. In Table 4, the cyclization ratio thereof is also shown.

Production Example 6

Production of a Polar-Group-Containing Cyclized Conjugated Diene Polymer B

A polar-group-containing cyclized conjugated diene polymer B was obtained in the same manner as in Production Example 5 except that the used amount of anhydrous p-toluenesulfonic acid was changed to 2.25 parts and the amount of sodium carbonate added after the cyclization reaction was changed to 0.78 part. Evaluations thereof were made in the same manner as in Production Example 5. The results are shown in Table 4. In Table 4, the cyclization ratio thereof is also shown.

Production Example 7

Production of a Polar-Group-Containing Cyclized Conjugated Diene Polymer C

A polar-group-containing cyclized conjugated diene polymer C was obtained and evaluated in the same manner as in Production Example 5 except that the polyisoprene was changed to a high cis polyisoprene having a weight-average molecular weight of 302,000, which was obtained by kneading Nipol IR-2200 (content of cis-1,4-bond units: 99% or more, manufactured by Nippon Zeon Corporation) roughly with rolls, the used amount of anhydrous p-toluenesulfonic acid was changed to 2.16 parts and the amount of sodium carbonate added after the cyclization reaction was changed to 0.75 part. The results are shown in Table 4. In Table 4, the cyclization ratio thereof is also shown.

Production Example 8

Production of a Polar-Group-Containing Cyclized Conjugated Diene Polymer D

A polar-group-containing cyclized conjugated diene polymer D was obtained and evaluated in the same manner as in Production Example 5 except that the polyisoprene was changed to a polyisoprene composed of 68% of cis-1,4-bond units, 25% of trans-1,4-bond units, and 7% of 3,4-bond units and having a weight-average molecular weight of 141,000, the used amount of anhydrous p-toluenesulfonic acid was changed to 2.69 parts and the amount of sodium carbonate added after the cyclization reaction was changed to 1.03 parts. The results are shown in Table 4.

TABLE 4

| | Production Example 5 | Production Example 6 | Production Example 7 | Production Example 8 |
|---|---|---|---|---|
| Polar-group-containing cyclized conjugated diene polymer | A | B | C | D |
| Weight-average molecular weight | 131,300 | 140,600 | 227,800 | 98,900 |
| Percent decrease in unsaturated-bond amount (%) | 64 | 58 | 61 | 68 |
| Cyclization ratio (%) | 79 | 72 | 76 | 83 |
| Polar group content (mmol/100 g) | 18 | 21 | 11 | 17 |

Example 10

The polar-group-containing cyclized conjugated diene polymer A was compression-molded at 100° C. in the atmosphere of nitrogen to produce a film (film-form oxygen absorber 10) 120 μm in thickness. The film-form oxygen absorber 10, 120 μm in thickness, cut into a size of 100 mm×100 mm was put together with 200 mL of air into a bag having a size of 150 mm×220 mm and made of a three-layer film composed of an outer layer polyethylene terephthalate film (PET) 12 μm in thickness, an intermediate layer aluminum foil (Al) 20 μm in thickness, and an inner layer polyethylene film (PE) 30 μm in thickness, and then the bag was sealed up. Next, this was allowed to stand still at 25° C. for one day, and then the concentration of oxygen inside the bag was measured with the oxygen concentration meter, so as to obtain the oxygen absorption amount of the film-form oxygen absorber 10. The result is shown in Table 5. The tensile strength of the oxygen absorber 10 was also measured before and after the absorption of oxygen. Thus, the retention ratio thereof was obtained. The result is shown in Table 5. The tear strength of the film-form oxygen absorber 10 was measured. As a result, it was 90.4 N/mm.

Examples 11 and 12

Film-form oxygen absorbers 12 and 13 were obtained in the same manner as in Example 10 except that the polar-group-containing cyclized conjugated diene polymer A was changed to the polar-group-containing cyclized conjugated diene polymers B and C, respectively. In the same manner as in Example 10, the oxygen absorption amounts thereof and the retention ratios of the tensile strength were measured. These results are shown in Table 5. About Example 11, the tear strength of the film-form oxygen absorber 11 was measured. As a result, it was 94.1 N/mm.

Example 13

Under nitrogen atmosphere, a 30% solution of the polar-group-containing cyclized conjugated diene polymer A in toluene was prepared. Thereto was added cobalt neodecanoate so as to set the amount of the cobalt metal to 300 ppm of the cyclized conjugated diene polymer A. A part of toluene was distilled off from this solution. Thereafter, the resultant was vacuum-dried to remove toluene, thereby obtaining the polar-group-containing cyclized conjugated diene polymer A containing cobalt neodecanoate.

A film-form oxygen absorber 13 was obtained in the same manner as in Example 10 except that the polar-group-containing cyclized conjugated diene polymer A containing cobalt neodecanoate was used instead of the polar-group-containing cyclized conjugated diene polymer A. The oxygen absorption amount and the retention ratio of the tensile strength were measured in the same manner as in Example 10. The results are shown in Table 5.

Examples 14 and 15

Film-form oxygen absorbers 14 and 15 were obtained in the same manner as in Example 13 except that the polar-group-containing cyclized conjugated diene polymer A was changed to the polar-group-containing cyclized conjugated diene polymers B and C, respectively. In the same manner as in Example 10, the oxygen absorption amounts thereof and the retention ratios of the tensile strength were measured. These results are shown in Table 5.

Example 16

A Henschel mixer was used to mix the polar-group-containing cyclized conjugated diene polymer A and a polypropylene (PP) having a melt flow rate (MFR) of 6.4 (manufactured by Idemitsu Petrochemical Co., Ltd., F-744NP) at a ratio of 80/20, and then the mixture was melted and kneaded by means of a biaxial extruder, the temperature of which was set to 210° C., so as to produce a polymer mixture in the form of pellets. The pellets were molded into a sheet form with electrothermal rolls of 180° C. temperature, and the sheet was compression-molded at 160° C. into a polar-group-containing cyclized conjugated diene polymer A/polypropylene kneaded film (film-form oxygen absorber 16) 120 μm in thickness. This kneaded film (film-form oxygen absorber 16) was cut into a size of 100 mm×100 mm, and put together with 200 mL of air into a bag having a size of 150 mm×220 mm and made of a three-layer film composed of an outer layer polyethylene terephthalate film (PET) 12 μm in thickness, an intermediate layer aluminum foil (Al) 20 μm in thickness, and an inner layer polyethylene film (PE) 30 μm in thickness, and then the bag was sealed up. Next, this was allowed to stand still at 25° C. for one day. Thereafter, the concentration of oxygen inside the bag was measured with the oxygen concentration in the film-form oxygen absorber 16 was obtained. From the measured result, the oxygen absorption amount of the film-form oxygen absorber 16 was obtained. The tensile strength of the film-form oxygen absorber 16 was also measured before and after the absorption of oxygen. Thus, the retention ratio thereof was obtained. The result is shown in Table 5. The tear strength of the film-form oxygen absorber 16 was measured. As a result, it was 152.8 N/mm. It is understood that the tear strength was excellent as compared with that of Example 10. This is an advantage effect based on the mixing of the PP.

Example 17

A Henschel mixer was used to mix the polar-group-containing cyclized conjugated diene polymer B and a polyethylene (PE) having a MFR of 2.0 (manufactured by Idemitsu Petrochemical Co., Ltd., LLDPE 0234) at a ratio of 45/55, and then the mixture was melted and kneaded by means of a biaxial extruder, the temperature of which was set to 200° C., so as to produce a polymer mixture in the form of pellets. The pellets were molded into a sheet form with electrothermal rolls of 180° C. temperature, and the sheet was compression-molded at 160° C. into a polar-group-containing cyclized conjugated diene polymer B/polyethylene kneaded film (film-form oxygen absorber 17) 120 μm in thickness. This kneaded film (film-form oxygen absorber 17) was cut into a size of 100 mm×100 mm, and put together with 200 mL of air into a bag having a size of 150 mm×220 mm and made of a three-layer film composed of an outer layer polyethylene terephthalate film (PET) 12 μm in thickness, an intermediate layer aluminum foil (Al) 20 μm in thickness, and an inner layer polyethylene film (PE) 30 μm in thickness, and then the bag was sealed up. Next, this was allowed to stand still at 25° C. for one day. Thereafter, the concentration of oxygen inside the bag was measured with the oxygen concentration meter. From the measured result, the oxygen absorption amount of the film-form oxygen absorber 17 was obtained. The tensile strength of the film-form oxygen absorber 17 was also measured before and after the absorption of oxygen. Thus, the retention ratio thereof was obtained. The result is shown in Table 5. The tear strength of the film-form oxygen absorber 17 was measured. As a result, it was 141.5 N/mm. It is understood that the tear strength was excellent as compared with that of Example 11. This is an advantage effect based on the mixing of the PE.

TABLE 5

| | Example 10 | Example 11 | Example 12 | Example 13 | Example 14 | Example 15 | Example 16 | Example 17 |
|---|---|---|---|---|---|---|---|---|
| Oxygen absorber | 10 | 11 | 12 | 13 | 14 | 15 | 16 | 17 |
| Polymer | Polar-group-containig cyclized conjugated diene polymer A | Polar-group-containig cyclized conjugated diene polymer B | Polar-group-containig cyclized conjugated diene polymer C | Polar-group-containig cyclized conjugated diene polymer A | Polar-group-containig cyclized conjugated diene polymer B | Polar-group-containig cyclized conjugated diene polymer C | Polar-group-containig cyclized conjugated diene polymer A/PP | Polar-group-containig cyclized conjugated diene polymer B/PE |
| Cobalt metal | Absent | Absent | Absent | Present | Present | Present | Absent | Absent |
| Oxygen absorption amount (mL/m$^2$ · day) | 59 | 61 | 68 | 66 | 67 | 76 | 48 | 28 |
| Retention ratio of tensile strength | ○ | ○ | ○ | ○ | ○ | ○ | ○ | ○ |

| | Comparative Example 1 | Comparative Example 2 | Comparative Example 3 | Comparative Example 4 | Comparative Example 5 | Comparative Example 6 |
|---|---|---|---|---|---|---|
| Oxygen absorber | C1 | C2 | C3 | C4 | C5 | C6 |
| Polymer | Polyisoprene | β-Pinene polymer | Ethylene-CPE copolymer | Polyisoprene | β-Pinene polymer | Ethylene-CPE copolymer |
| Cobalt metal | Absent | Absent | Absent | Present | Present | Present |
| Oxygen absorption amount (mL/m$^2$ · day) | 5 | 9 | 2 | 38 | 58 | 52 |
| Retention ratio of tensile strength | X | X | ○ | X | X | ○ |

Example 18

A lab blender (WARING BLENDOR, model 34BL97, manufactured by Waring Commercial Co.) was used to pulverize the polar-group-containing cyclized conjugated diene polymer D in the atmosphere of nitrogen, so as to obtain a powder-form oxygen absorber 18 having a number-average molecular weight of 150 μm.

Two grams of the powder-form oxygen absorber 18 was put together with 200 mL of air into a bag having a size of 150 mm×220 mm and made of a three-layer film composed of an outer layer polyethylene terephthalate film (PET), an intermediate layer aluminum foil (Al), and an inner layer polyethylene film (PE), and then the bag was sealed up. This was allowed to stand still at 30° C. for one day. Thereafter, the concentration of oxygen inside the bag was measured with the oxygen concentration meter. From the measured result, the oxygen absorption amount of the film-form oxygen absorber 18 was obtained. As a result, it was 12 mL ($O^2$)/g·day.

The following are understood from Table 5.

The oxygen absorber wherein polyisoprene is used and no cobalt salt is contained is poor in oxygen-absorbing ability and the retention ratio of tensile strength (Comparative Example 1). When a cobalt salt is incorporated thereinto, the oxygen-absorbing ability is improved but is insufficient. The retention ratio of the tensile strength is also poor (Comparative Example 4).

The oxygen absorber wherein β-pinene polymer is used and no cobalt salt is contained is poor in oxygen-absorbing ability and the retention ratio of tensile strength (Comparative Example 2). When a cobalt salt is incorporated thereinto, the oxygen-absorbing ability is improved but the retention ratio of tensile strength is poor (Comparative Example 5).

The oxygen absorber wherein ethylene-cyclopentene (CPE) copolymer is used and no cobalt salt is contained is poor in oxygen-absorbing ability (Comparative Example 3). When a cobalt salt is incorporated thereinto, the oxygen-absorbing ability is somewhat improved but is insufficient (Comparative Example 6).

On the contrary to these comparative examples, the oxygen absorbers of the invention are excellent in oxygen-absorbing ability and the retention ratio of tensile strength whether or not a cobalt salt is contained therein (Examples 10 to 12). When the cobalt salt is contained therein, the oxygen-absorbing ability is slightly better (Examples 13 to 15).

It is also understood that the oxygen absorbers containing a polar-group-containing cyclized conjugated diene polymer and a thermoplastic resin are also excellent in oxygen-absorbing ability and the retention ratio of tensile strength (Examples 16 and 17).

Also, the powder-form oxygen absorber of the invention is excellent in oxygen-absorbing ability (Example 18).

The invention claimed is:

1. An oxygen absorber, containing a cyclized conjugated diene polymer as an active ingredient.

2. The oxygen absorber according to claim 1, wherein a percent decrease in unsaturated-bond amount of the cyclized conjugated diene polymer is 10% or more.

3. The oxygen absorber according to claim 1, wherein a weight-average molecular weight of the cyclized conjugated diene polymer is 1,000 to 1,000,000.

4. The oxygen absorber according to claim 1, containing the cyclized conjugated diene polymer as the active ingredient, and further containing a thermoplastic resin.

5. The oxygen absorber according to claim 4, wherein the thermoplastic resin is at least one selected from the group consisting of polyolefin resin, polyester resin, and polyamide resin, and polyvinyl alcohol resin.

6. The oxygen absorber according to claim 1, containing 500 ppm or lower of an antioxidant.

7. The oxygen absorber according to claim 1, which is in a film, sheet or powder form.

8. The oxygen absorber according to claim 1, wherein the cyclized conjugated diene polymer is a polymer containing a polar group.

9. The oxygen absorber according to claim 8, wherein the polar group is at least one group selected from the group consisting of acid anhydride, carboxyl, hydroxyl, ester, epoxy and amino groups.

10. The oxygen absorber according to claim 8, wherein the content of the polar group is 0.1 to 200 mmol per 100 g of the polar-group-containing cyclized conjugated diene polymer.

* * * * *